United States Patent Office 3,104,524
Patented Sept. 24, 1963

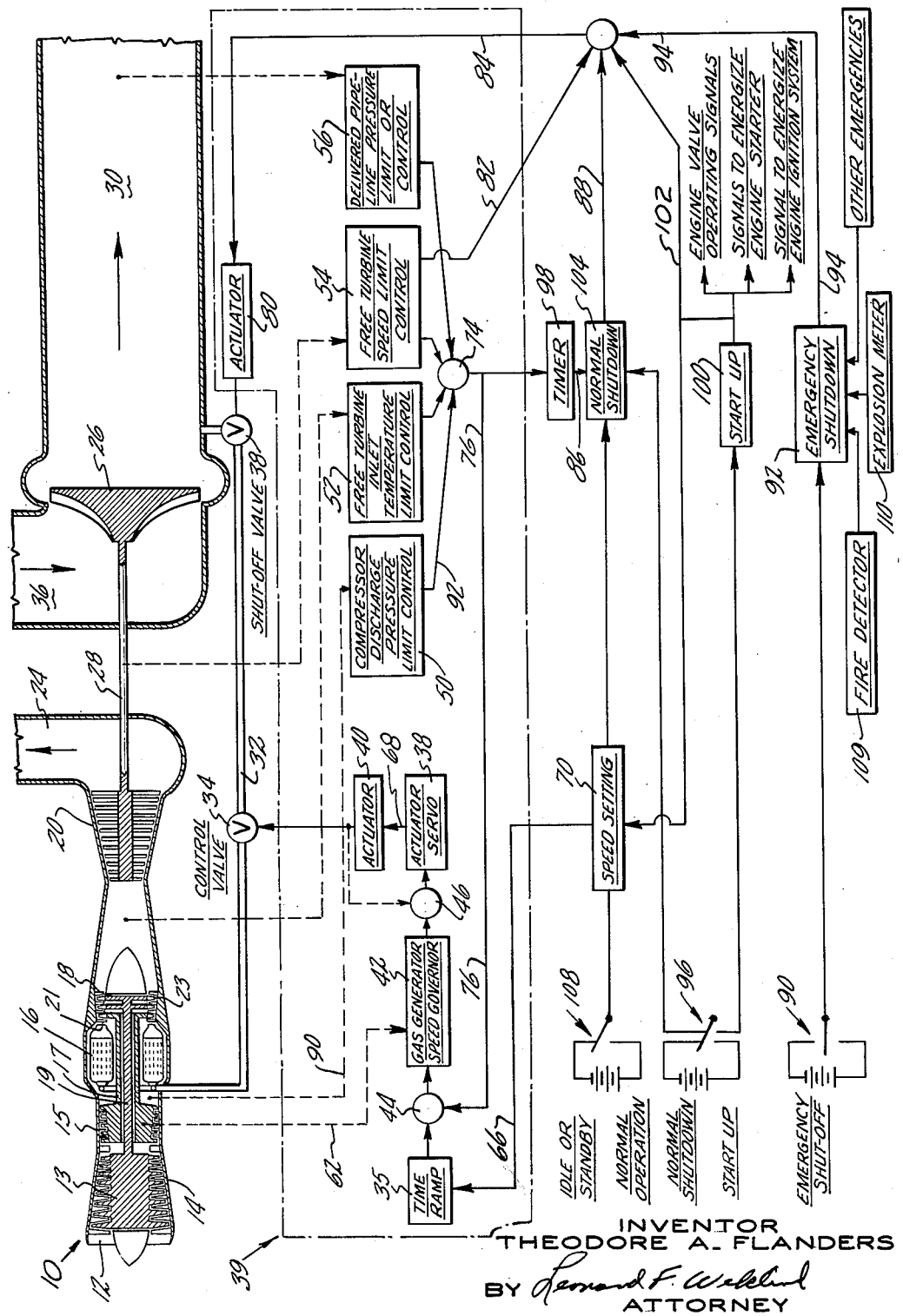

3,104,524
NORMAL AND EMERGENCY FUEL CONTROL FOR A RE-EXPANSION GAS TURBINE ENGINE
Theodore A. Flanders, Windsor, Conn., assignor to United Aircraft Corporation, East Hartford, Conn., a corporation of Delaware
Filed May 16, 1960, Ser. No. 29,309
10 Claims. (Cl. 60—39.16)

This invention relates to a fluid flow system and more particularly to a pumping system for compressing natural gases for pipeline transmission.

It has generally been the practice in pipeline transmission to pump natural gases by utilizing either diesel or other reciprocating type of engines as the power source. Because of the high pressure required for efficient transmission of the natural gases through a pipeline, these engines have been exceedingly large and due to the size of these engines, which are in themselves noisy and characterized as being excessively vibratory, it has been necessary to house such engines in massive buildings which are capable of withstanding the vibratory forces. Furthermore, it is also generally well known that the reciprocating type of engine is comparatively complex, requiring many component parts, and in order to keep these engines in an operable or working condition, constant attention and maintenance is required.

In contrast, it is generally well known that the turbine type of power plant is relatively simple, requiring few component parts, and since it produces less vibratory action, it lends itself to being an excellent substitution therefor. For these reasons, the upkeep of a turbo type power plant in order to keep it in an operable condition would require less attention and maintenance as that required of the aforementioned types of engines. It would therefore follow, due to the low vibratory characteristics of the turbo type power plant, that the structure required to house this type of engine would be exceedingly less massive and in turn less expensive.

The turbine type power plant has heretofore been principally adapted to supplying propulsive power for aircraft uses. Due to the stringent requirements dictated by the many variables affecting the aircraft, the fuel controls necessary for the turbine type power plant have been generally relatively complex. For example, such fuel controls require a highly sensitive computation system to assure that the quantity of fuel consumed by the turbine type power plant is commensurate with power plant operating conditions and yet only sufficient as not to cause harm or destruction to the engine. In many instances such fuel controls employ intricate devices as multiplication systems, systems defining acceleration limits comprising three dimensional cams, etc.

It is therefore an object of this invention to provide a fuel control for a turbine type of power plant which has heretofore been normally used to propel aircraft for stationary power producing purposes and which is characterized as being simple in design and construction and highly reliable.

Another object of this invention is the utilization of the turbine type power plant for driving a pump either of the rotary or positive displacement type in a pipeline for the transmission of natural gases and the utilization of a portion of said gases for consumption in the turbine type power plant.

It still is another object of this invention to provide a fuel control which has relatively few parts and yet affords efficient and safe operation of the turbine type power plant.

It still is a further object of this invention to provide a fuel control which regulates the quantity of fuel to the turbine type power plant in accordance with its speed independent of the varying load conditions.

It still is a further object of this invention to provide a fuel control of the type described which maintains the speed of the turbine type power plant in accordance with the plurality of engine parameters and maintaining the operation of said power plant within safe operating conditions.

It still is another object of this invention to provide a fuel control of the type described which senses the pressure of the natural gases in the pipeline for biasing the speed of the power plant to maintain the pressure of the gases sufficiently high and yet within the structural capabilities of said pipeline.

And still another important feature of this invention is to combine a plurality of power plant operating variables and the pressure of the natural gases within the pipeline and biasing the speed setting of the fuel control for limiting the power output of the turbine type power plant.

To those skilled in the art it will become readily apparent that various changes and modifications of this novel scheme could be made without departing from the scope of this invention as will be more evident by the following description written in connection with the attached drawing.

The single FIGURE is a schematic and block diagram showing a turbine type power plant, a pipeline and the control elements which make up a preferred embodiment of this invention. The turbine type power plant, which for convenience of terminology, is hereinafter referred to as engine, is generally indicated by numeral 10 having an inlet section 12, compressor section 14, combustion or burner section 16, a first turbine section 18, a second turbine section 20, and an exhaust section 24. The compressor section comprises two sets of compressor blades 13 and 15, which are mechanically connected by co-axial shafts 17 and 19 to turbines 21 and 23, respectively, in turbine section 18. The products of combustion, due to the burning of fuel, are emitted from combustion section 16, propel the turbines 21 and 23, which in turn drives compressor 13 and 15 respectively. It is to be noted that these turbines are mechanically connected to the compressor and are hereinafter referred to as the gas generator turbine and the speed of turbine 21 and 23, including compressors 13 and 15, is hereinafter referred to as an ($N_G$). The gases emitted from the gas generator turbine are still at a high energy level which is utilized to propel turbine 20. Since the turbines in the first and second turbine sections are not physically connected to each other, it can be said that turbine 20 is free or has only an aerodynamic connection with the turbines in the first turbine section. Since the turbine in the second section has no mechanical connection to the remainder of the power plant, it is referred to as a free turbine and the speed of this free turbine is hereinafter referred to as "$N_F$." The spent gases discharged from the free turbine are exhausted through exhaust section 24.

The turbojet engine is suitably coupled to pump 26 (shown for illustration purposes as a centrifugal type) by shaft 28 for driving the pump which compresses the gases for transmission thru pipeline 30 from a source 36 to a point remote from that source.

An important feature of this invention is the utilization of a portion of the natural gases for fuel consumption by the engine. As shown, conduit 32 connects the combustion section 16 with pipeline 30 downstream of pump 26. The amount of fuel delivered to the combustion section is controlled by the control or throttle valve 34 which may be any suitable type. The throttle valve serves as a variable restriction for metering the quantity of fuel to the engine. A shutoff valve 36 is disposed in conduit 32 between pipeline 30 and throttle valve 34 which will be described herein below in more detail. An actual showing of the construction of valves 34 and 36 which may take the form of butterfly valves are not deemed necessary for an understanding of this invention but a showing of such a valve capable of performing the required functions can be found by referring to copending U.S. application Serial No. 778,489 entitled "Electronic Back Pressure Control" and assigned to the same assignee.

The fuel control for regulating the speed of the turbojet engine is generally indicated by numeral 39 and having as its main elements actuator 40, actuator servo 38, gas generator speed governor 42, time ramp 35, compressor discharge pressure limit control 50, free turbine inlet temperature limit control 52, free turbine speed limit control 54, and delivered pipeline pressure limit control 56. The general arrangement of the control elements which go to make up this invention is shown in its preferred form but it is to be understood that the actual mechanism for performing the functions to be described herein can be of any of the well-known existing devices. It will be apparent that the same results without departing from the scope of this invention can be obtained whether hydraulic, pneumatic, electrical, or the combination thereof provides the motivating medium for controlling the engine. Generally, the fuel control of this invention regulates the speed of the engine in accordance with a preselected speed and senses a plurality of engine operating variables and the pressure of natural gases in pipeline 30 in order to maintain (1) the engine operating within its safe limits and (2) the pressure of natural gases sufficiently high for efficient transmission but yet below the structural integrity of the pipeline. The parameters sensed are "$N_G$," engine compressor discharge pressure (CDP, "$N_F$," inlet temperatures (T) of turbine 20, and the pressure (P) of the natural gases in pipeline 30.

In order to maintain or regulate the speed of the engine at its proper operating condition, a speed signal which is indicative of the desired speed is sent to the gas generator speed governor 42 via line 66 and is compared with the actual speed of the engine, that is $N_G$, which is taken off of the compressor section 14 and transmitted to gas generator speed governor 42 via line 62, and if there is a discrepancy between these two speed signals, a speed difference or error will be evidenced at junction point 46. This error signal is then fed to actuator servo 38 where it is amplified to increase its magnitude and then fed into actuator 40 via line 68. The actuator 40 in turn positions valve 34 to throttle or vary the amount of fuel delivered to the engine which in turn varies the speed of the engine to abate the error signal. Actuator 40 in its preferred form is an integrating type of control which is known to have an inherently slow time responsiveness. To compensate for this time lag, I have provided a negative feedback circuit which ascertains the position of valve 34 and feeds back a signal indicative of this position to the junction point 46. Since this signal is indicative of the amount of change being made at that instant, it will tend to reduce the amount of error being fed into actuator servo 38 which effects a reduction in the error signal commensurate with a change in the quantity of fuel being delivered to the engine and thereby increasing the speed responsiveness of this system. From the foregoing it will be apparent that during the steady state operation of the turbojet engine the speed of the engine will be made to remain constant regardless of the load variations created on compressors 13 and 15 and hence on the engine.

In transient conditions of power plant operations as it is generally well known, when the speed of the compressor accelerates too quickly, there is a tendency for the compressor to surge; that is to say, the fluid pressure in the compressors would begin to pulsate and the effect of this pulsation condition could impair the operation of the engine and even cause serious harm thereto. Time ramp 35 is interposed between the gas generator speed governor 42 and speed setting 70 and functions to deliver a time derivative of this signal to the gas generator speed governor in the event of a rapid change of required speed is evidenced in line 66. Derivative devices such as RC circuits or electric motors operating through a gear reduction system with limit switches are well known in the art and an example of a suitable device is more fully illustrated in U.S. application Serial No. 778,489 now Patent No. 3,003,331 supra.

To keep the turbojet engine operating within safe limits and protect both the turbojet engine and gas pumping equipment from damage, the speed setting signal is reset by the desired operating plant variables or pipeline variables. These variables or parameters which I have selected are (1) CDP, (2) (T), (3) $N_F$, and (4) (P). All of these signals are combined in a common summation junction 74 and then fed into junction point 44 via line 76 for biasing the speed set signal. Sensing devices and limit controls are all well known in the art and only a brief explanation of these devices is deemed necessary for an understanding of this invention.

CDP is sensed between the burner or combustion section 16 and compressor section 14. This signal is continuously fed via line 90 to the compressor discharge pressure limit control 50. Compressor discharge pressure limit control is set at a desired operating condition for the turbojet engine and a predetermined limit is selected wherein the power is limited so as not to overwork the engine, thus insuring a longer operating life thereto. When the control 50 exceeds this predetermined limit, a signal therefrom is sent to summation junction 74 via line 92 where it is in turn transmitted to summation junction 44 for resetting the speed setting signal.

All the other sensing and control elements can be described in essentially the same manner as the above. However, it should be realized that the type of control medium (i.e. whether pneumatic, hydraulic, electric or the combination thereof is used) that is used will dictate the actual construction details of the control. For example, if an electrical medium is used, it would be preferred to use an electrical speed sensing circuit as as illustrated in application Serial No. 825,694 entitled "Speed Indicator," or if either a hydraulic or pneumatic system is used it would be preferred to use a mechanical speed sensing device as shown in S. G. Best Patent #2,822,666 issued on February 11, 1958 assigned to the same assignee.

It may be desirable to continuously bias the speed setting in accordance with the pressure of the fluid in pipeline 30. To accomplish this the delivered pipeline pressure control can be made to continuously sense the fluid pressure and relay a signal which is either proportional or a function thereof. A suitable device is more fully illustrated in the Best patent U. S. 2,872,666 supra.

For the engine and gas line apparatus protection in the event of malfunction several of the same parameters may be utilized for automatically initiating shutdown of the engine. As shown, when CDP, $N_F$, T, or P exceed its predetermined limit as set in their respective controls 50, 52, 54, and 56, a timer 98 may be employed to sense this output signal at junction 74 and actuate a timing mechanism contained within timer 98, for holding this signal for a predetermined time and if the signal continues to persist the timer 98 transmits a signal to actuate 80 via line 86, 88 and 84 by way of normal shutdown relay box 104 for blocking off fuel to the engine and hence ceasing operation thereof. The timer can be an electric motor that operates through a gear train to close a switch. It would run when a signal is applied and be reset when it is removed. It thus takes a finite time to close the switch while the signal is available.

Free turbine speed limit control 54 may have two overspeed limit set points for insuring protection to the engine. As mentioned above, in the event of an overspeed, the speed setting input is reset to automatically adjust the engine's speed to a lower value. However, it is realized that the free turbine could virtually run away before the resetting feature could correct for this overspeed. Thus, the second or maximum limit value is set in free turbine speed limit control 54 and upon an overspeed an overspeed signal is transmitted to actuator 80 to shut-off valve 38. From the foregoing, it is apparent that any number of variables can readily be sensed for automatically stopping the engine. Since it is expected that one of the purposes of the above-described pump systems is utilization in an environment containing natural gases, I have provided means for easily adapting environmental variables or parameters for automatic engine shut off. Switch 90 has been shown for manually stopping the engine. Upon closing switch 90 which is connected to a direct current source of electricity, relay box or emergency shutdown control 92 will be energized, causing a signal to be transmitted to actuator 80 via line 94, and 84 for closure of valve 38 and hence blocking off fuel flow to the engine. (If a hydraulic or pneumatic medium is used, well known transducers may be used to convert the electrical signal to the improper type fluid pressure responsive.) As shown for example, well known fire and explosive detection devices 109 and 110 are provided to sense two of such variables for actuating relay mechanism 92 to automatically shut off the engine.

It will be understood that the emergency shut down devices may be omitted depending on the particular environmental requirements.

In order to start the turbojet engine a switch 96 connected to a source of electrical energy is closed directing a signal to start circuit 100 which supplies a signal to actuator 80 via line 102 and 84 for opening shut-off valve 38. Simultaneously, signals are transmitted to the engine starter and engine ignition system (all not shown) and speed setting 70 for energizing the fuel control 39 for standby condition. Control valve 34 which is at this time in its closed position can be made to permit a predetermined leakage of fuel to pass to the engine, thus providing a minimum flow of fuel. During starting, the $N_G$ governor is made inoperative until the engine reaches a self-sustaining operating condition. Switch 108 connected to an electrical source is placed in the idle or standby position, thus putting the speed setting device 70 in a minimum speed set condition. When the engine has reached its desired speed, switch 108 is put in the normal operation condition and the $N_G$ governor is called in to take over the controlling of the engine speed. Switch 108 can be made to be either a manual or automatic operating type. Switching mechanism capable of performing this function is illustrated in application Serial No. 778,486, now Patent No. 2,971,495 supra.

What has been described is a fuel control system that will automatically control the turbojet engine's fuel supply to maintain a desired speed of the $N_F$ turbine, regardless of the load exerted on the engine. The fuel consumed by the engine is apportioned from the natural gas. A plurality of engine parameters and a condition of the natural gases have been utilized to reset the speed of the engine in order to provide a longer operating life thereto and affording safe operating conditions.

It should be understood that the invention is not limited to the particular embodiments shown and described herein, but that various changes and modifications may be made in the arrangement of parts without departing from the scope of this novel concept as defined in the following claims:

I claim:

1. In a fluid flow system for transmission of a gas from a source to a point remote from said source including a turbine type power plant having a combustion section, a first and second turbine, means defining a passage, a pump being driven by said power plant disposed in said passage, a conduit connecting said passage with said combustion section, a valve disposed in said conduit, means for controlling said valve comprising a governor responsive to the speed of one of said turbines, means responsive to the speed of said other turbine for producing a first signal, means responsive to a compressor pressure for producing a second signal, means responsive to a temperature of the gas at one of said turbines for producing a third signal, means responsive to a pressure in said passage for producing a fourth signal, means combining all of said signals and means for converting said signals upon reaching a value above a predetermined limit over the preselected value of any one of said signals for resetting said governor.

2. In a fluid flow system as claimed in claim 1 including a shutoff valve in series relation with said valve, an actuator for controlling said shutoff valve and said actuator being responsive to said first signal, said second signal, said third signal and said fourth signal.

3. In a fluid flow system as claimed in claim 2 including means for overriding said first signal, said second signal, said third signal and said fourth signal for controlling said actuator.

4. In a fuel control system for a turbine type of powerplant having a compressor for driving a variable load including a turbine comprising, in combination, a conduit for delivering fuel to the powerplant, a first valve and a second valve in series relation disposed in said conduit for regulating the flow of fuel therethrough, speed control means responsive to the speed of said compressor for producing a first signal, means responsive to a preselected speed setting value for producing a second signal, means responsive to the difference between the first signal and the second signal for controlling said first valve, means responsive to a pressure in proximity to the load, a compressor discharge pressure, said turbine inlet temperature and speed for resetting said speed control means, said second valve normally in an open position and operative to override the effect of said first valve, said second valve movable in a closed position in response to a compressor discharge pressure, inlet turbine temperature and the speed of the variable load for overriding the effect of said first valve.

5. In a fuel control system as claimed in claim 4 including an emergency control system comprising manually operated means connected to said second valve for effectuating closure thereof.

6. In a fuel control system as claimed in claim 5 including means responsive to the enviornmental temperature and pressure conditions surrounding the turbine type of powerplant, said means connected to said second valve for effectuating closure of said second valve upon either the environmental temperature or pressure reaching a predetermined value.

7. In a fuel control system for a turbine type of powerplant driving a variable load, the powerplant having a burner, a compressor, a first turbine driving the compressor, a second turbine driving the variable load, the fuel control comprising, in combination, a source of fuel under pressure, a conduit for delivering fuel to the burner, a metering valve and shutoff valve in series in said conduit, said metering valve being movable in response to compressor speed, temperature intermediate the first and second turbines, compressor discharge pressure, variable load speed, said shutoff valve being shut off in response to compressor discharge pressure, temperature intermediate said first and second turbines, and variable load speed.

8. In a fuel control system as claimed in claim 7 including a timer device operatively connected to said shutoff valve for delaying the time said shutoff valve responds to the compressor discharge pressure and temperature intermediate said first and second turbines.

9. In a fuel control system as claimed in claim 8 including an emergency system connected to said shutoff valve and bypassing said timer, said emergency system comprising means responsive to a mechanical operated switch, and an environmental condition in proximity to the powerplant for shutting off said shutoff valve.

10. In a fuel control system as claimed in claim 7 wherein said metering valve responsive to said compressor speed includes a speed responsive governor, means for selectively scheduling the operating speed of said governor, and a derivative sensitive device located between said scheduling means and said governor for regulating the rate of time that said governor responds to said scheduling means.

References Cited in the file of this patent
UNITED STATES PATENTS

| | | |
|---|---|---|
| 2,625,789 | Starkey | Jan. 20, 1953 |
| 2,757,549 | Dale | Aug. 7, 1956 |
| 2,822,666 | Best | Feb. 11, 1958 |
| 2,856,754 | Torell | Oct. 21, 1958 |
| 2,923,128 | Fortmann | Feb. 2, 1960 |
| 2,924,935 | Moore | Feb. 16, 1960 |
| 2,937,497 | Clark | May 24, 1960 |
| 2,938,338 | Creswick | May 31, 1960 |
| 2,958,190 | Rogers | Nov. 1, 1960 |
| 2,996,883 | Fortmann | Aug. 22, 1961 |
| 3,032,983 | Embre | May 8, 1962 |

FOREIGN PATENTS

| | | |
|---|---|---|
| 811,563 | Great Britain | Apr. 8, 1959 |